United States Patent [19]

Höhner et al.

[11] Patent Number: 5,665,155
[45] Date of Patent: Sep. 9, 1997

[54] ORGANOFUNCTIONAL POLYSILOXANES FOR MODIFYING THE SURFACE OF FINELY DIVIDED PARTICLES

[75] Inventors: Werner Höhner, Velbert; Dietmar Schaefer, Hattingen, both of Germany

[73] Assignee: Th. Goldschmidt AG., Essen, Germany

[21] Appl. No.: 595,053

[22] Filed: Jan. 31, 1996

[30] Foreign Application Priority Data

Jan. 2, 1995 [DE] Germany ............... 195 03 102.4

[51] Int. Cl.$^6$ ............... C09D 7/12; C09D 183/06; C09C 3/12; C08L 83/06
[52] U.S. Cl. ............... 106/287.14; 549/214; 549/439
[58] Field of Search ............... 106/287.14; 549/214, 549/439

[56] References Cited

U.S. PATENT DOCUMENTS

| | | | |
|---|---|---|---|
| 5,132,047 | 7/1992 | Tanaka et al. | 252/308 |
| 5,281,478 | 1/1994 | Hohner et al. | 428/404 |
| 5,387,467 | 2/1995 | Hohner et al. | 428/391 |
| 5,425,804 | 6/1995 | Shinohara et al. | 106/2 |
| 5,561,099 | 10/1996 | Murphy et al. | 504/116 |
| 5,562,761 | 10/1996 | Dirschl et al. | 252/8.62 |

FOREIGN PATENT DOCUMENTS

| | | | |
|---|---|---|---|
| 0321322 | 6/1989 | European Pat. Off. | B01J 13/02 |
| 0373426 | 6/1990 | European Pat. Off. | C09L 3/12 |
| 4140793 | 3/1993 | Germany | C09L 3/12 |
| 4140794 | 3/1993 | Germany | C09L 3/12 |
| 2244489 | 2/1991 | United Kingdom | C08K 9/06 |

*Primary Examiner*—David Brunsman
*Attorney, Agent, or Firm*—Anderson Kill & Olick P.C.

[57] ABSTRACT

The invention relates to a coating material comprising polyorganosiloxanes with ester and/or epoxide groups, linked to silicon atoms over carbon atoms, for modifying the surface of finely divided particles, such as pigments and fillers, or of glass fibers.

1 Claim, No Drawings

ORGANOFUNCTIONAL POLYSILOXANES FOR MODIFYING THE SURFACE OF FINELY DIVIDED PARTICLES

FIELD OF INVENTION

The invention relates to an inventive coating material for modifying the surface of finely divided pigments, fillers or glass fibers. Said coating material comprises polyorganosiloxanes with ester groups and/or epoxide groups, linked to silicon atoms over carbon atoms.

BACKGROUND INFORMATION AND PRIOR ART

It is well known that the properties of pigments and fillers can be improved by depositing organosilicon compounds on their surfaces. By means of such a coating, the incorporation and dispersion of the pigments or fillers in lacquers, dispersion paints, plastics, toners, building materials, enamels or the like is facilitated. Moreover, the agglomeration of pigments and fillers during storage and processing is to be avoided by means of such a coating with organosilicon compounds. It is furthermore desirable to reduce the formation of dust during production and storage of pigments and fillers.

This state of the art is summarized in EP-A-0 373 426. The object of EP-A-0 373 426 are paint and magnet pigments containing at least 0.1% by weight and not more than 5% by weight of one or several polyorganosiloxanes, which have a viscosity of 100 to 100,000 mPa×sec and a relative molecular weight of 500 to 500,000, contain no reactive or cross-linking groups and contain at least one Si-alkyl and/or Si-aryl group with 9 to 25 carbon atoms per molecule, these groups constituting 7 to 70% by weight of the polyorganosiloxane, the remaining organic groups in the polyorganosiloxane having 1 to 8 carbon atoms.

The organosilicon compounds, named in the aforementioned EP-A-0 373 426, admittedly are suitable in many cases for coating paint pigments. However, they frequently fail with fillers, such as magnesium or aluminum oxides or their oxide hydrates. Frequently, a better dispersability of the coated particles and a better adhesion of the coating to the surface of the particles is also desired.

In the British patent application GB 2,244,489, a filler is claimed, which is provided with a layer of cross-linked silicone elastomers, which are bound chemically to the surface of the inorganic core. It is evident from the Examples cited there that, initially, highly cross-linked silicone elastomers with a plurality of reactive Si—OH groups (also referred to as "rubbery reactive silicones") are prepared which, after their application on the inorganic filler, must be cured on this filler for 4 hours at 250° C. The silicone elastomer is the product of a cross-linking reaction between a "multifunctionally terminated" polysiloxane and a silane cross-linking agent. These coating materials are cross-linked elastomers, which are intended to improve the mechanical properties, such as the extensibility and toughness, of filled polymers.

In the EP-A-0 321 322, magnetizable particles are disclosed, which are in a matrix of a cross-linked polyorganosiloxane and can have a particle diameter ranging from 0.05 to 3 μm. The polysiloxane matrix is produced by hydrosilylating vinylsiloxanes with hydrogensiloxanes in the presence of magnetizable particles. The vinylsiloxane or hydrogensiloxane may optionally contain further reactive or also non-reactive groups and, optionally, also ionogenic groups, which are linked to a silicon atom over an Si—C bond. Good dispersability in aqueous systems is said to be achieved with the magnetizable composite particles described there. The coated, magnetizable particles find use in medicine, biology and diagnostics.

In the German patents DE-B-41 40 793 and DE-B-41 40 794, polyorganosiloxanes are described, which have epoxy groups or ester groups, which are linked over carbon atoms to silicon, in combination with long-chain alkyl groups.

These are universally suitable for coating finely divided particles, such as pigments and fillers, in order to improve their dispersability in and compatibility with organic media, such as lacquers and synthetic resins.

However, at the high processing temperatures, customarily employed, for example, for incorporating pigments and fillers in thermoplastic materials or for stoving lacquers, these coating materials exhibit inadequate heat stability. This can lead to yellowing, particularly in cases where pigments and fillers are contained in high proportion.

The present invention is concerned with the technical problem of finding coating materials for finely divided particles which, on the one hand, bring about a good dispersion of the coated particles in the organic media, without causing yellowing of the end product at higher processing or treatment temperature.

Surprisingly, it was found that these side effects can be prevented essentially by replacing the long-chain alkyl groups of DE-B-41 40 793 and DE-B-41 40 794 by alkaryl groups.

OBJECT OF THE INVENTION

An object of the invention is a coating material for modifying the surface of pigments, fillers or glass fibers.

Said coating material comprises polyorganosiloxanes with ester groups and/or epoxide groups linked to silicon atoms over carbon atoms and having the general formula

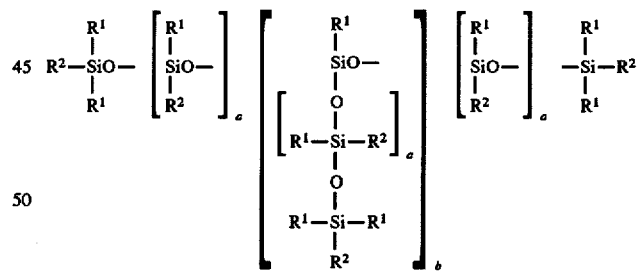

wherein $R^1$ is an alkyl group with 1 to 18 carbon atoms, at least 90% of the $R^1$ groups being $CH_3$ groups;

$R^2$ to the extent of 50 to 99% is identical with the $R^1$ groups and, to the extent of 1 to 50%, is identical with the $R^3$ and $R^4$ groups;

$R^3$ is a group of the formula $—(CH_2)_n—CO—OR^5$, and/or

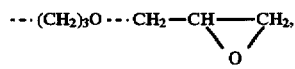

and/or

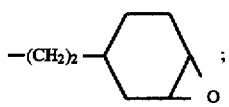

$R^5$ is an alkyl group with 1 to 4 carbon atoms;
n is a number from 3 to 20;
$R^4$ is a group of formula

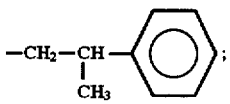

the ratio of $R^3$ groups to $R^4$ groups being 1:25 to 10:1, with the proviso that there must be at least one $R^3$ group and at least one $R^4$ in the average molecule;
a is a number from 1 to 500; and
b is a number from 0 to 10.

$R^1$ is an alkyl group with 1 to 4 carbon atoms or a phenyl group. At least 90% of the $R^1$ groups should be methyl groups. In particular, it is preferred that all $R^1$ groups be methyl groups. However, the compatibility with lacquers can be improved in many cases by the introduction of phenyl groups.

Of the $R^2$ groups, 50 to 99% may be identical with the $R^1$ groups. The remaining $R^2$ groups characterize the organofunctional groups, which are formed from two different types:

The one organofunctional $R^3$ group may be an ester group of formula —$(CH_2)_n$—CO—$OR^5$, n being a number from 3 to 20 and $R^5$ being an alkyl group with 1 to 4 atoms. Preferably, n has a value of 6 to 16 and particularly of 8 to 12. $R^5$ preferably is a methyl or ethyl group. Especially preferred is the —$(CH_2)_{10}$CO—$OCH_3$ group, which combines good product properties with ready availability. This $R^3$ group shows the desired, graded reactivity.

Alternatively, the $R^3$ group is an epoxy group of the formula

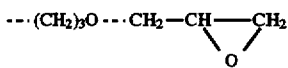

and/or of the formula

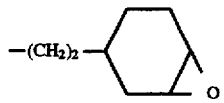

This epoxy group also provides the desired substantivity and graded reactivity of the polyorganosiloxane, which is to be used pursuant to the invention.

In the molecule of the polyorganosiloxane, which is to be used pursuant to the invention, 1 to 50% of the $R^2$ groups are identical with the $R^3$ and $R^4$ groups. The ratio of $R^3$ groups to $R^4$ groups should be 1:25 to 10:1, with the proviso that at least one $R^3$ group and one $R^4$ group must be present in the average polyorganosiloxane molecule.

The $R^3$ and $R^4$ groups may be terminal and/or pendant groups. Polyorganosiloxanes with pendant $R^3$ and $R^4$ groups are preferred.

The structure of the polyorganosiloxane is determined by the value of the a and b subscripts. a characterizes the content of difunctional siloxy units, while b indicates the degree of cross-linking. a has a value of 1 to 500 and preferably of 2 to 100. b has a value of 0 to 10 and preferably of 0 to 5.

The compounds can be synthesized by known methods by the addition reaction between α-methylstyrene, unsaturated esters of the formula $CH_2$=CH—$(CH_2)_{n-2}$CO—$OR^5$, allyl glycidyl ethers or vinylcyclohexene oxide and polyorganosiloxanes, the appropriate proportion of $R^2$ groups of which has been replaced by —H groups, in the presence of suitable catalysts, such as platinum compounds, for example, $H_2PtCl_6$ or in the presence of platinum deposited on carrier materials.

The application properties of the compounds, used pursuant to the invention, are described in greater detail in the following examples. It is understood that these examples are provided by way of illustration and not by way of limitation.

EXAMPLES OF THE APPLICATION

For various reasons (capacity, viscosity), high processing temperatures are specified for the incorporation of pigments and fillers in synthetic resins.

To check the effectiveness of the modifiers, which are to be used pursuant to the invention, titanium dioxide was treated, by way of example, for one hour in a shaking mill (Scandex Type BAS 20) with 15 mm balls and 0.2 to 1% by weight addition of the polyorganosiloxanes to be tested and then exposed to a temperature of 250° C. for 30 minutes.

After cooling, the pigments, so pretreated, were dispersed in a solution consisting of 80 parts by weight of 2-ethoxyethyl acetate and 20 parts by weight of Plexigum PM 391 in the ratio of 40% by weight of solution to 60 parts by weight of pigment.

This dispersion was applied with a 200 μ doctor blade on previously cleaned sheet metal and dried under mild conditions. The dried film was evaluated visually and by measuring the yellowing.

As coating material, the following modified polyorganosiloxane, which is to be used pursuant to the invention, was employed.

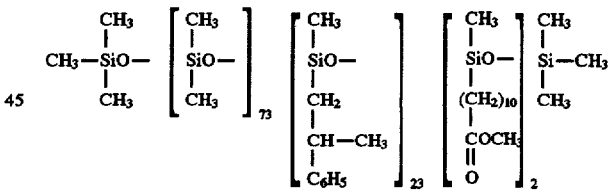

For comparison purposes, the polyorganosiloxane of the state of the art, having the following formula, is used as coating material:

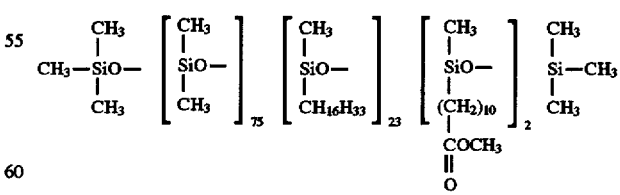

For incorporating pigments and fillers into synthetic resins, high processing temperatures are specified for various reasons (capacity, viscosity).

To check the effectiveness of the modifiers, which are to be used pursuant to the invention, titanium dioxide was treated, by way of example, in a shaking mill (Scandex Type BAS 20 with 15 mm balls and 0.2 to 1% by weight addition of the polyorganosiloxanes to be tested and then exposed to a temperature of 250° C. for 30 minutes.

After cooling, the pigments, so pretreated, were dispersed in a solution consisting of 80 parts by weight of 2-ethoxyethyl acetate and 20 parts by weight of Plexigum PM 391 in the ratio of 40% by weight of solution to 60 parts by weight of pigment.

This dispersion was applied with a 200 μ doctor blade on previously cleaned sheet metal and dried under mild conditions. The dried film was evaluated visually and by measuring the yellowing.

The yellowing was measured with the Byk Colour Gloss. The following values were determined:

| | |
|---|---|
| 1% by weight addition - of the invention: | L* = 94.02 |
| | a* = 0.08 |
| | b* = 0.10 |
| 1% by weight addition - comparison: | L* = 88.66 |
| | a* = −0.25 |
| | b* = 4.10 |

The comparison numbers are averages of three measurements.

In interpreting the values, it should be noted that L* represents yellowing, a*− represents green, a*+ represents red and b*+ represents yellow. Accordingly, it is clear that the inventive product is superior to the comparison product, particularly in the area of yellowing and yellow tinge.

The measured result is also confirmed visually under all conventional light conditions.

What is claimed is:

1. A coating material for modifying a surface of a finely divided pigment, filler or glass fiber wherein the coating material comprises a polyorganosiloxane with ester groups, epoxide groups or both linked to silicon atoms over carbon atoms and having a general formula

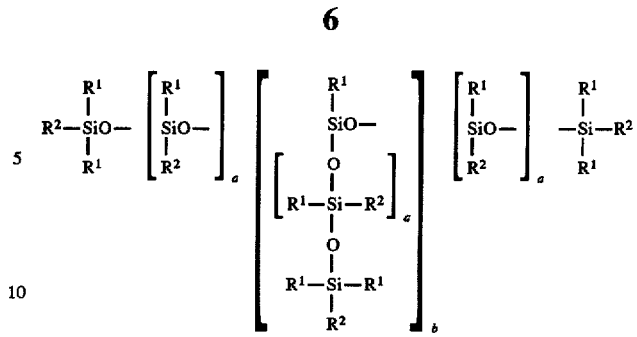

wherein $R^1$ is an alkyl group with 1 to 18 carbon atoms, at least 90% of the $R^1$ groups being $CH_3$ groups;

$R^2$ to the extent of 50 to 99% is identical with the $R^1$ groups and, to the extent of 1 to 50%, is identical with the $R^3$ and $R^4$ groups;

$R^3$ is a group of the formula $-(CH_2)_n-CO-OR^5$, and/or

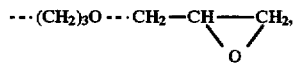

and/or

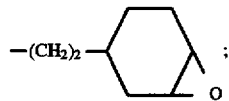

$R^5$ is an alkyl group with 1 to 4 carbon atoms;
n is a number from 3 to 20;
$R^4$ is a group of formula

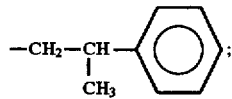

the ratio of $R^3$ groups to $R^4$ groups being 1:25 to 10:1, with the proviso that there must be at least one $R^3$ group and at least one $R^4$ in the average molecule;
a is a number from 1 to 500; and
b is a number from 0 to 10.

* * * * *